US012693368B2

(12) United States Patent　　　　(10) Patent No.:　US 12,693,368 B2
Thomas et al.　　　　　　　　　　　(45) Date of Patent:　　　Jul. 28, 2026

(54) REPORTING POSITIONING MEASUREMENTS

(71) Applicant: Lenovo (Singapore) Pte. Ltd., New Tech Park (SG)

(72) Inventors: Robin Thomas, Bad Nauheim (DE); Karthikeyan Ganesan, Kronberg im Taunus (DE); Ankit Bhamri, Rödermark (DE); Hyejung Jung, Northbrook, IL (US); Vijay Nangia, Woodridge, IL (US); Hossein Bagheri, Urbana, IL (US); Ravi Kuchibhotla, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 457 days.

(21) Appl. No.: 18/000,181

(22) PCT Filed: May 28, 2021

(86) PCT No.: PCT/IB2021/054721
§ 371 (c)(1),
(2) Date: Nov. 29, 2022

(87) PCT Pub. No.: WO2021/240477
PCT Pub. Date: Dec. 2, 2021

(65) Prior Publication Data
US 2023/0204705 A1　　Jun. 29, 2023

Related U.S. Application Data

(60) Provisional application No. 63/031,995, filed on May 29, 2020.

(51) Int. Cl.
G01S 5/00　　　(2006.01)
G01S 5/02　　　(2010.01)
H04W 64/00　　(2009.01)

(52) U.S. Cl.
CPC .......... G01S 5/0036 (2013.01); G01S 5/0218 (2020.05); G01S 5/0236 (2013.01); H04W 64/00 (2013.01); G01S 2205/008 (2013.01)

(58) Field of Classification Search
None
See application file for complete search history.

(56) References Cited

U.S. PATENT DOCUMENTS

2014/0062793 A1* 3/2014 AlSindi ................. G01S 5/0218
　　　　　　　　　　　　　　　　　　　　342/450
2019/0372652 A1 12/2019 Sadiq et al.
(Continued)

FOREIGN PATENT DOCUMENTS

CN　　　109392001 A　　2/2019
CN　　　110574327 A　　12/2019
(Continued)

OTHER PUBLICATIONS

PCT/IB2021/054721, "Notification of Transmittal of the International Search Report and the Written Opinion of the International Searching Authority, or the Declaration", International Searching Authority, Sep. 2, 2021, pp. 1-62.
(Continued)

*Primary Examiner* — Resha Desai
*Assistant Examiner* — Brandon James Henson
(74) *Attorney, Agent, or Firm* — Kunzler Needham & Hilton

(57) ABSTRACT

Apparatuses, methods, and systems are disclosed for reporting positioning measurements. One method includes receiving positioning measurement configuration information including: a list of candidate beams, wherein each candidate beam of the list of candidate beams is associated with a positioning reference signal; a priority indicator; a temporal switching criteria; and/or a reporting criteria for positioning.
(Continued)

1000

Begin

1002 — Measure, At A User Equipment, A Positioning Reference Signal Of Each Candidate Beam Of A List Of Candidate Beams Based On Positioning Measurement Configuration Information 1004 — Receive A Line-Of-Sight Reporting Criteria Or A Non-Line-Of-Sight Reporting Criteria 1006 — Classify The Positioning Reference Signal Measurement As Non-Line-Of-Sight Or Line-Of-Sight 1008 — Report The Positioning Reference Signal Measurement Of At Least One Beam Of The List Of Candidate Beams, Wherein The Reported Positioning Reference Signal Measurement Is Based On The Line-Of-Sight Reporting Criteria Or The Non-Line-Of-Sight Reporting Criteria 1010 — Reselect A Beam Of The List Of Candidate Beams Based On The Positioning Reference Signal Measurement For Performing Positioning End The reporting criteria includes a positioning reference signal received power, a non-line-of-sight measurement indicator, a line-of-sight measurement indicator, and/or a reporting priority for each candidate beam of the list of candidate beams. The method includes measuring a positioning reference signal associated with each candidate beam of the list of candidate beams based on an associated positioning reference signal configuration. The method includes reporting positioning measurements based on the reporting criteria for at least one candidate beam of the list of candidate beams.

20 Claims, 8 Drawing Sheets

(56)                    References Cited

U.S. PATENT DOCUMENTS

| | | | | |
|---|---|---|---|---|
| 2019/0380056 | A1* | 12/2019 | Lee | H04B 7/0695 |
| 2020/0014487 | A1* | 1/2020 | Akkarakaran | H04L 1/0013 |
| 2022/0014335 | A1 | 1/2022 | Si et al. | |
| 2022/0311488 | A1* | 9/2022 | Shreevastav | H04W 64/00 |

FOREIGN PATENT DOCUMENTS

| | | | | |
|---|---|---|---|---|
| CN | 111182579 | A | 5/2020 | |
| WO | 2017014572 | A1 | 1/2017 | |
| WO | 2018202056 | A1 | 11/2018 | |
| WO | WO-2020067964 | A1 * | 4/2020 | G01S 1/042 |

OTHER PUBLICATIONS

VIVO, "Discussion on potential positioning enhancements", 3GPP TSG RAN WG1 #101 R1-2003429, May 25-Jun. 5, 2020, pp. 1-13.
Qualcomm Inc., "Initial thoughts on Potential Positioning Enhancements", 3GPP TSG RAN WG1 #101-e R1-2004492, May 25-Jun. 5, 2020, pp. 1-14.
Ericsson, "Chairman's notes of AI 7.2.8 Maintenance of NR Positioning Support", 3GPP TSG-RAN WG1 Meeting #101-e Tdoc R1-2005091, May 25-Jun. 5, 2020, pp. 1-6.
Ericsson, "Session Notes 8.5 (NR Positioning Enhancements)", 3GPP TSG-RAN WG1 Meeting #104b-e Tdoc R1-2103982, Apr. 12-20, 2020, pp. 1-5.
Mediatek, "Report of session on positioning and sidelink relay", 3GPP TSG-RAN WG2 Meeting #113bis-e R2-2104305, Apr. 12-20, 2021, pp. 1-37.
Qualcomm Inc., "New SID on NR Positioning Enhancements", 3GPP TSG RAN Meeting #86 RP-193237, Dec. 9-12, 2019, pp. 1-4.
Intel Corp et al., "Revised WID on NR Positioning Enhancements", 3GPP TSG RAN Meeting #91e RP-210903, Mar. 16-26, 2022, pp. 1-6.
3GPP, "3rd Generation Partnership Project; Technical Specification Group Radio Access Network; Study on NR Positioning Enhancements; (Release 17)", 3GPP TR 38.857 V0.0.1, May 2020, pp. 1-9.
3GPP, "3rd Generation Partnership Project; Technical Specification Group Radio Access Network; Study on channel model for frequencies from 0.5 to 100 GHz (Release 16)", 3GPP TR 38.901 V16.1.0, Dec. 2019, pp. 1-101.
3GPP, "3rd Generation Partnership Project; Technical Specification Group Radio Access Network; LTE Positioning Protocol (LPP) (Release 16)", 3GPP TS 37.355 V16.0.0, Mar. 2020, pp. 1-281.
3GPP, "3rd Generation Partnership Project; Technical Specification Group Radio Access Network; NR; Physical layer measurements (Release 16)", 3GPP TS 38.214 V16.1.0, Mar. 2020, pp. 1-151.
3GPP, "3rd Generation Partnership Project; Technical Specification Group Radio Access Network; NR; Physical layer measurements (Release 16)", 3GPP TS 38.215 V16.1.0, Mar. 2020, pp. 1-22.
3GPP, "3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305 V16.0.0, Mar. 2020, pp. 1-107.

* cited by examiner

100

104

104

102

104

102

102

300

400

| Measured Candidate Beam IDs | Measured Time instance (ms) | Measured (P)RS RSRP (dBm) | $\Delta t_{Switch\_Beam}$ (ms) |
|---|---|---|---|
| 1 | $t_0$ | -90 | $t_{Beam\_Failure}$ - $t_0$ |
| 2 | $t_1$ | -104 | $t_{Beam\_Failure}$ - $t_1$ |
| 3 | $t_2$ | -90 | $t_{Beam\_Failure}$ - $t_2$ |
| 4 | $t_3$ | -100 | $t_{Beam\_Failure}$ - $t_3$ |

500

| Measured Candidate Beam IDs | Priority Indications | Measured (P)RS RSRP (dBm) |
|---|---|---|
| 1 | 1 | -90 |
| 2 | 2 | -104 |
| 3 | 3 | -90 |
| 4 | 4 | -100 |

600

| Configured (P)RS RSRP Interval (α) to Priority Mapping | Measured Candidate Beam IDs | Measured (P)RS RSRP (dBm) | UE-assigned Priority Indications |
|---|---|---|---|
| -44≤ α≤-68 : Priority 1 | 1 | -90 | 2 |
| -92≤ α≤-69: Priority 2 | 2 | -104 | 3 |
| -116≤ α≤-93: Priority 3 | 3 | -80 | 1 |
| -140≤ α≤-117 Priority 4 | 4 | -100 | 2 |

700

| Measured Candidate Beam IDs | NLOS/LOS Classification | Measured (P)RS RSRP (dBm) |
|---|---|---|
| 1 | LOS | -100 |
| 2 | NLOS | -130 |
| 3 | LOS | -110 |
| 4 | NLOS | -140 |

800

| TRP A: Measured Candidate Beam IDs (Serving gNB) | NLOS/LOS Classification | Measured (P)RS RSRP (dBm) |
|---|---|---|
| A1 | NLOS | -130 |
| A2 | NLOS | -130 |
| A3 | NLOS | -139 |
| A4 | NLOS | -140 |
| TRP B: Measured Candidate Beam IDs (Serving/Neighboring) gNB) | | |
| B1 | LOS | -95 |
| B2 | NLOS | -130 |
| B3 | LOS | -105 |
| B4 | NLOS | -140 |

900

1000

REPORTING POSITIONING MEASUREMENTS

CROSS-REFERENCE TO RELATED APPLICATIONS

This application claims priority to U.S. Patent Application Ser. No. 63/031,995 entitled "APPARATUSES, METHODS, AND SYSTEMS FOR UE-BASED RAPID BEAM RESELECTION FOR POSITIONING" and filed on May 29, 2020 for Robin Thomas, which is incorporated herein by reference in its entirety.

FIELD

The subject matter disclosed herein relates generally to wireless communications and more particularly relates to reporting positioning measurements.

BACKGROUND

In certain wireless communications networks, positioning measurements may be made. In such embodiments, various reports may be made.

BRIEF SUMMARY

Methods for reporting positioning measurements are disclosed. Apparatuses and systems also perform the functions of the methods. One embodiment of a method includes receiving, at a user equipment, positioning measurement configuration information including: a list of candidate beams, wherein each candidate beam of the list of candidate beams is associated with a positioning reference signal; a priority indicator; a temporal switching criteria; and/or a reporting criteria for positioning. The reporting criteria includes a positioning reference signal received power, a non-line-of-sight measurement indicator, a line-of-sight measurement indicator, and/or a reporting priority for each candidate beam of the list of candidate beams. In some embodiments, the method includes measuring a positioning reference signal associated with each candidate beam of the list of candidate beams based on an associated positioning reference signal configuration. In certain embodiments, the method includes reporting positioning measurements based on the reporting criteria for at least one candidate beam of the list of candidate beams.

One apparatus for reporting positioning measurements includes a user equipment. In some embodiments, the apparatus includes a receiver that receives positioning measurement configuration information including: a list of candidate beams, wherein each candidate beam of the list of candidate beams is associated with a positioning reference signal; a priority indicator; a temporal switching criteria; and/or a reporting criteria for positioning. The reporting criteria includes a positioning reference signal received power, a non-line-of-sight measurement indicator, a line-of-sight measurement indicator, and/or a reporting priority for each candidate beam of the list of candidate beams. In various embodiments, the apparatus includes a processor that: measures a positioning reference signal associated with each candidate beam of the list of candidate beams based on an associated positioning reference signal configuration; and reports positioning measurements based on the reporting criteria for at least one candidate beam of the list of candidate beams.

Another embodiment of a method for reporting positioning measurements includes measuring, at a user equipment, a positioning reference signal of each candidate beam of a list of candidate beams based on positioning measurement configuration information. In certain embodiments, the method includes receiving a line-of-sight reporting criteria or a non-line-of-sight to reporting criteria. In various embodiments, the method includes classifying the positioning reference signal measurement as non-line-of-sight or line-of-sight. In some embodiments, the method includes reporting the positioning reference signal measurement of at least one beam of the list of candidate beams. The reported positioning reference signal measurement is based on the line-of-sight reporting criteria or the non-line-of-sight reporting criteria. In certain embodiments, the method includes reselecting a beam of the list of candidate beams based on the positioning reference signal measurement for performing positioning.

Another apparatus for reporting positioning measurements includes a user equipment. In some embodiments, the apparatus includes a processor that measures a positioning reference signal of each candidate beam of a list of candidate beams based on positioning measurement configuration information. In various embodiments, the apparatus includes a receiver that receives a line-of-sight reporting criteria or a non-line-of-sight reporting criteria. In certain embodiments, the processor: classifies the positioning reference signal measurement as non-line-of-sight or line-of-sight; reports the positioning reference signal measurement of at least one beam of the list of candidate beams, wherein the reported positioning reference signal measurement is based on the line-of-sight reporting criteria or the non-line-of-sight reporting criteria; and reselects a beam of the list of candidate beams based on the positioning reference signal measurement for performing positioning.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
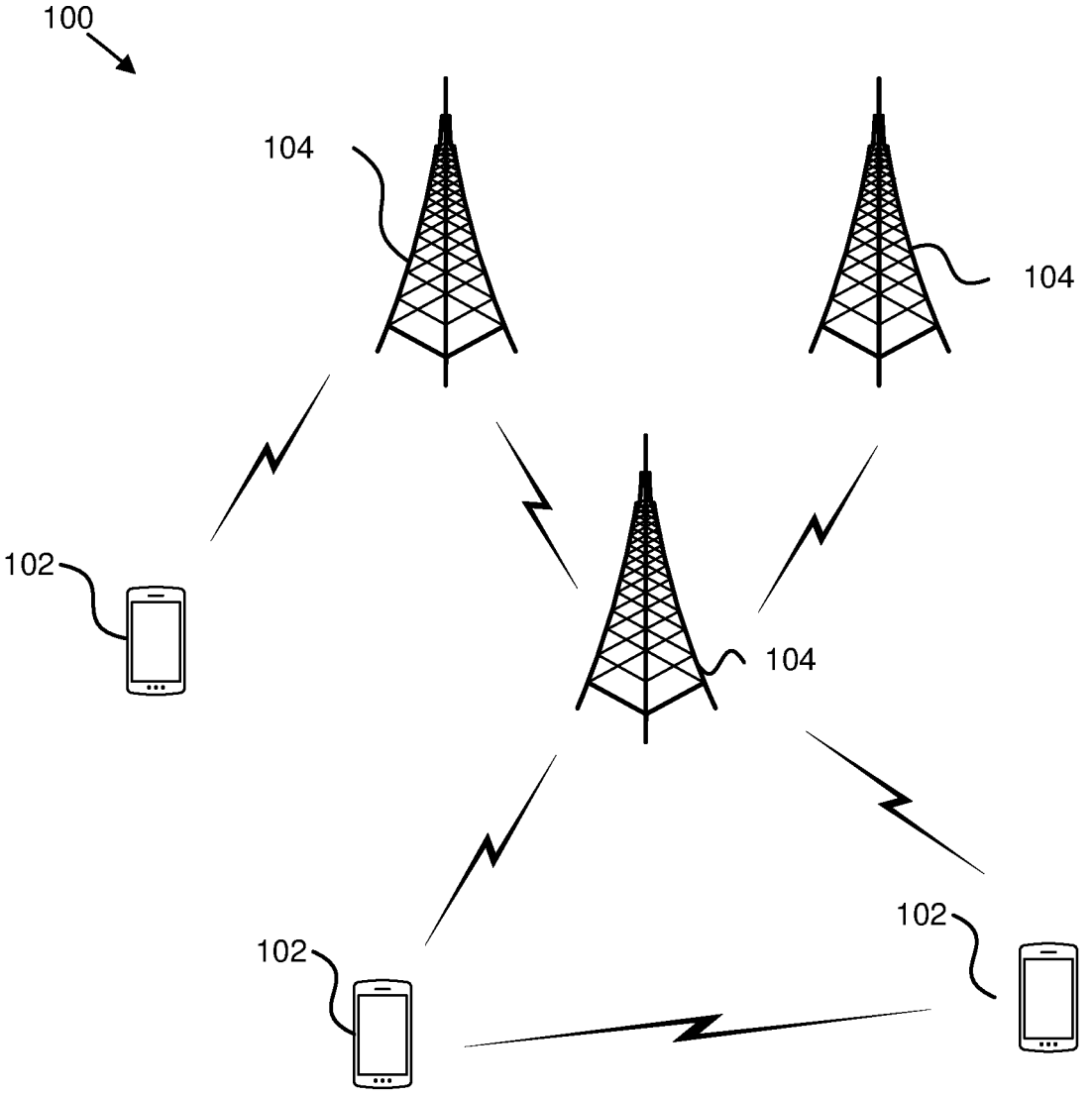
FIG. 1 is a schematic block diagram illustrating one embodiment of a wireless communication system for reporting positioning measurements.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for reporting positioning measurements. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE")

802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may receive positioning measurement configuration information including: a list of candidate beams, wherein each candidate beam of the list of candidate beams is associated with a positioning reference signal; a priority indicator; a temporal switching criteria; and/or a reporting criteria for positioning. The reporting criteria includes a positioning reference signal received power, a non-line-of-sight measurement indicator, a line-of-sight measurement indicator, and/or a reporting priority for each candidate beam of the list of candidate beams. In some embodiments, the remote unit 102 may measure a positioning reference signal associated with each candidate beam of the list of candidate beams based on an associated positioning reference signal configuration. In certain embodiments, the remote unit 102 may report positioning measurements based on the reporting criteria for at least one candidate beam of the list of candidate beams. Accordingly, the remote unit 102 may be used for reporting positioning measurements.

In certain embodiments, a remote unit 102 may measure a positioning reference signal of each candidate beam of a list of candidate beams based on positioning measurement configuration information. In certain embodiments, the remote unit 102 may receive a line-of-sight reporting criteria or a non-line-of-sight reporting criteria. In various embodiments, the remote unit 102 may classify the positioning reference signal measurement as non-line-of-sight or line-of-sight. In some embodiments, the remote unit 102 may report the positioning reference signal measurement of at least one beam of the list of candidate beams. The reported positioning reference signal measurement is based on the line-of-sight reporting criteria or the non-line-of-sight reporting criteria. In certain embodiments, the remote unit 102 may reselect a beam of the list of candidate beams based on the positioning reference signal measurement for performing positioning. Accordingly, the remote unit 102 may be used for reporting positioning measurements.

Figure 2:
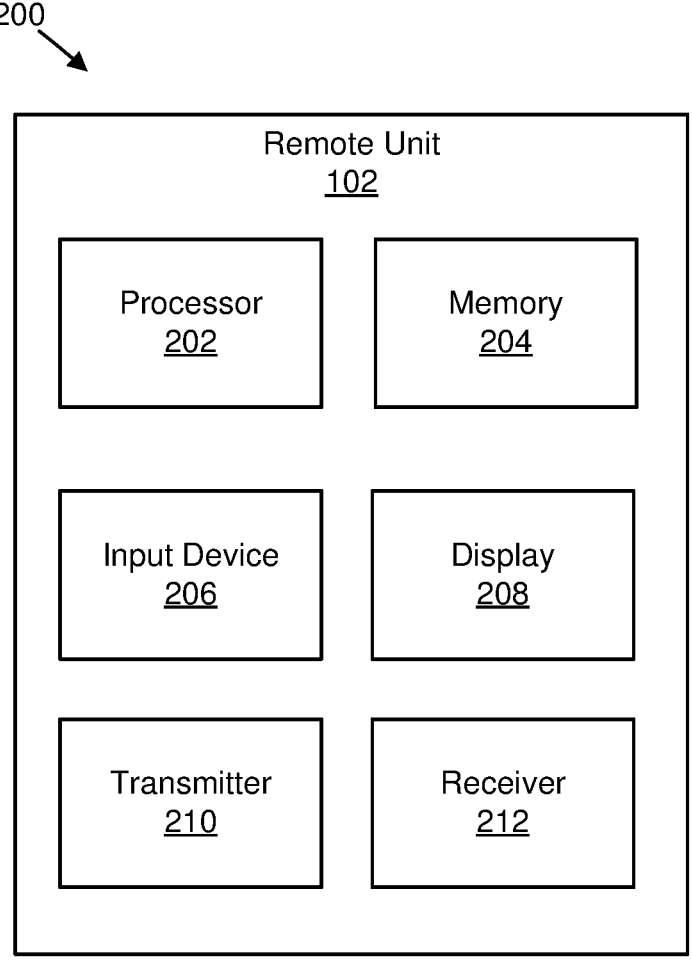
FIG. 2 is a schematic block diagram illustrating one embodiment of an apparatus that may be used for reporting positioning measurements.

FIG. 2 depicts one embodiment of an apparatus 200 that may be used for reporting positioning measurements. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations.

For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In certain embodiments, the receiver 212 receives positioning measurement configuration information including: a list of candidate beams, wherein each candidate beam of the list of candidate beams is associated with a positioning reference signal; a priority indicator; a temporal switching criteria; and/or a reporting criteria for positioning. The reporting criteria includes a positioning reference signal received power, a non-line-of-sight measurement indicator, a line-of-sight measurement indicator, and/or a reporting priority for each candidate beam of the list of candidate beams. In various embodiments, the processor 202: measures a positioning reference signal associated with each candidate beam of the list of candidate beams based on an associated positioning reference signal configuration; and reports positioning measurements based on the reporting criteria for at least one candidate beam of the list of candidate beams.

In some embodiments, the processor 202 measures a positioning reference signal of each candidate beam of a list of candidate beams based on positioning measurement configuration information. In various embodiments, the receiver 212 receives a line-of-sight reporting criteria or a non-line-of-sight reporting criteria. In certain embodiments, the processor 202: classifies the positioning reference signal measurement as non-line-of-sight or line-of-sight; reports the positioning reference signal measurement of at least one beam of the list of candidate beams, wherein the reported positioning reference signal measurement is based on the line-of-sight reporting criteria or the non-line-of-sight reporting criteria; and reselects a beam of the list of candidate beams based on the positioning reference signal measurement for performing positioning.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
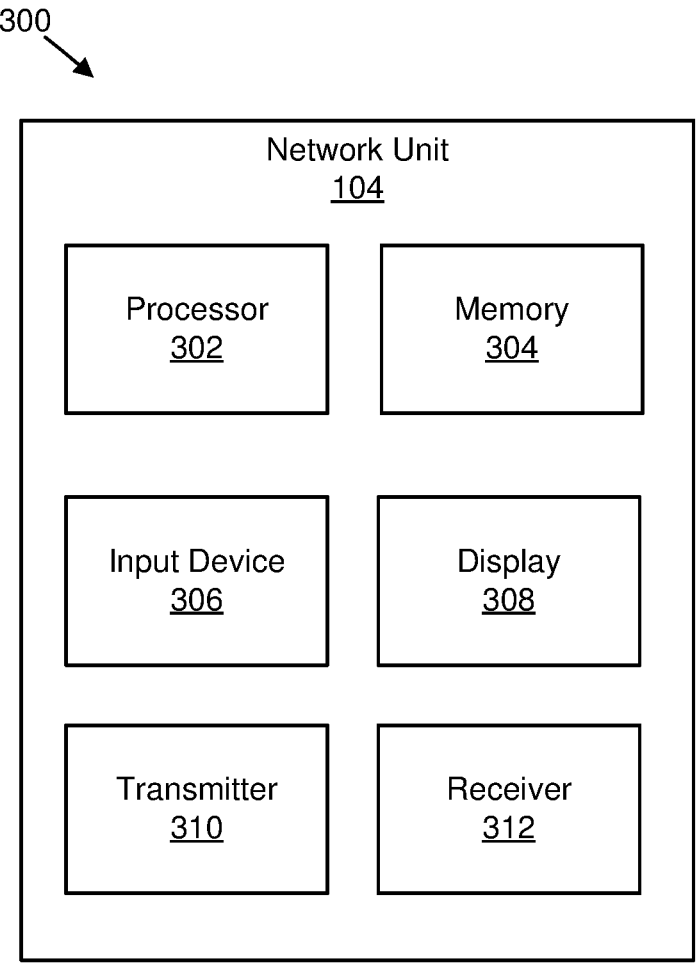
FIG. 3 is a schematic block diagram illustrating one embodiment of an apparatus that may be used for reporting positioning measurements.

FIG. 3 depicts one embodiment of an apparatus 300 that may be used for reporting positioning measurements. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, target device and/or user equipment ("UE") positioning using new radio ("NR") technology may be used. In such embodiments, positioning features may include fifth generation core network ("5GC") architectural and interface elements, and radio access node ("RAN") functionality that supports physical layer and layer 2 and/or layer 3 signaling procedures to enable NR positioning.

In some embodiments NR positioning may be used to facilitate reduced latency and higher reliability positioning. In various embodiments, beam-based positioning through positioning reference signal ("PRS") transmission from different transmission and reception points ("TRPs") may be performed. In such embodiments, a resulting TRP and/or beam failure may directly affect positioning performance in terms of lowered accuracy and increased latency corresponding to a UE's position estimate.

In certain embodiments, a beam failure, a non-line-of-sight ("NLOS") beam, and/or a lack of suitable line-of-sight ("LOS") beam may impact positioning-related measurements performed at a UE and may decrease a positioning accuracy required by a location server (e.g., UE-assisted positioning) or at the UE (e.g., UE-based positioning).

In some embodiments, positioning resiliency may be a factory floor or industrial internet of things ("IoT") ("IIoT") setting used to meet a stringent precision and low latency for various IIoT applications.

In various embodiments, mechanisms may be used to improve latency and reliability of a positioning estimate by performing rapid beam reselection and/or switching using a time-based criteria, priority indications, LOS and/or NLOS indications, and/or positioning error criteria.

In certain embodiments, positioning-related measurements may be defined as measurements of a signal (e.g., PRS or SRS) used for the purpose of performing positioning using certain techniques (e.g., downlink ("DL") time distance of arrival ("TDOA"), angle of departure ("AoD"), multi round trip time ("RTT") ("multi-RTT"), and so forth).

In some embodiments, a dynamic TRP selection mechanism may be enabled to allow for location services that have flexible accuracy adaptation.

In various embodiments, an efficient method may be used to add beam measurement candidates for increasing an accuracy of a UE's position estimate. Such embodiments may support dynamic accuracy adaptation at the UE.

In certain embodiments, enhanced resiliency and low latency UE positioning may be obtained in relation to beam and TRP reselection for increased positioning performance.

In some embodiments, a mechanism may be used to rapidly select and/or switch to a suitable beam and/or TRP containing positioning-related reference signal ("RS") transmissions such as PRS after beam failure or NLOS beam detection based on a configured candidate list of beams and TRPs at a UE to maintain or increase UE positioning accuracy during an occurrence of such events. In such embodiments, a configured beam-candidate list may be provided to the UE by a network (e.g., gNB using radio resource control ("RRC"), location server using LTE positioning protocol ("LPP")) or based on a pre-configuration. Moreover, in such embodiments, positioning reference signals for candidate beams may be periodically measured with configurable intervals and based on a timing criteria, a priority indication, and/or an LOS and/or NLOS beam indication of an associated location request and positioning-related RS. In such embodiments, the candidate beams may be periodically updated at the UE and may be used for rapid switching upon beam failure (e.g., activation of a timer, upon detection of physical layer problems in an RRC_Connected state), upon NLOS beam detection, or if no LOS beams are detected. Further, in such embodiments, a timing criteria may be based on a shortest time difference between a time of a failure event on a first beam and a time instance that a measurement of a most suitable RS reference signal received power ("RSRP") on a second beam (e.g., selected from a candidate-beam) has been completed. Such embodiments may benefit a DL TDOA positioning technique if at least 3 beams belonging to a same TRP and/or different TRPs containing PRS resources are required for reference signal time difference ("RSTD") measurements (e.g., 1 reference beam together with 2 other beams).

In various embodiments, a rapid and efficient mechanism may be used to avoid beam selection (or reselection) procedures for reliable and low latency positioning. In such embodiments, selected positioning-related RS resources from each beam candidate within a single TRP or set of TRPs to perform positioning related measurements may allow for increased accuracy depending on factors such as a configured positioning-related RS bandwidth of a selected beam candidate.

In certain embodiments, an indoor factory or IIoT environment may increase a likelihood of beam failure due to factors such as link blockage, high probability of NLOS, variability of an indoor environment (e.g., movement of people and objects), clutter density, and variable base station and UE heights. First and second embodiments describe a two-level rapid beam switching mechanism. In the first embodiment, fast beam switching within a configured beam-candidate list may be used. For at least one TRP, there may be a set of candidate beams for PRS transmission. If one of the beams for a given TRP is not suitable for positioning measurements, then a UE may switch a receive ("RX") beam to receive the PRS from a different beam of the same TRP. In the second embodiment, fast and/or rapid TRP switching for beam-candidates belonging to different TRPs may be used. The second embodiment may comprise both rapid beam and TRP switching and/or reselection. If all the beams for a TRP are exhausted or deemed not suitable for PRS measurement, the UE may switch to another TRP within a set of TRP candidates.

In some embodiments, there may be direct switching of TRPs without going through switching of beams within a TRP (e.g., if there are AoD methods in which location diversity of the TRP may increase either the horizontal accuracy or the vertical accuracy.

Embodiments described herein may facilitate low latency positioning with increased horizontal accuracy and vertical accuracy.

In various embodiments, there may be fast beam switching within a configured-beam candidate list. In certain embodiments, UE-based rapid beam selection and switching mechanisms may be enabled using a timing-based criterion.

In certain embodiments, beam recovery procedures may be divided as follows: 1) beam-failure detection: UE detecting that a beam failure has occurred; 2) candidate beam identification: UE identifying a new suitable beam pair to recover a link and connection; 3) recovery request: UE transmits a recovery request to a network (e.g., serving gNB); and 4) recovery request response: gNB transmits a beam recovery response to the UE.

In some embodiments, in the context of positioning, a beam failure may result in a measurement loss of PRS resources which were initially configured by a location management function ("LMF"). Such beam failure may degrade an original accuracy required before initiating a positioning request. Furthermore, in such embodiments, for positioning techniques such as DL-TDOA, which rely on RSTD measurements between a pair of PRS resources and/or PRS resource sets, beam failure or NLOS beams may contribute to positioning accuracy degradation and a loss of the configured RSTD measurement. Beams which are NLOS to a UE, may need to be reselected since these beams may result in a decrease in accuracy of the UE's position estimate.

In various embodiments, a UE may be allowed to rapidly select a next available beam based on a configured or preconfigured beam-candidate list, which is triggered upon the following events: 1) beam-failure detection containing a positioning-related RS configuration (e.g., activation of a timer, detection of physical problems in an RRC_Connected state); 2) NLOS beam detection containing a positioning-related RS configuration; and 3) being unable to detect a required number of LOS beams containing a positioning-related RS configuration for a positioning technique (e.g., based on a number of an LOS beam threshold parameter).

In certain embodiments, rapid selection may be based on a timing-based criterion defined by: $\Delta t_{Switch\_Beam} = t_{Beam\_failure} - t_{RS\_RSRP\_Beam}$, where $\Delta t_{Switch\_Beam}$ is a time difference between an instance in which beam failure has occurred, $(t_{Beam\_Failure})$/NLOS beam has been detected $(t_{NLOS\_detection})$ on the first beam, and the instance that the measured PRS RSRP of a second beam from a candidate-beam list preconfigured at a UE has been completed. The UE may consider this specified criterion to perform rapid beam switching in addition to measuring the RS RSRP. The candidate beam with the shortest $\Delta t_{Switch\_Beam}$ and the best corresponding PRS RSRP may then be selected. In some examples, the candidate beam is an LOS beam.

In some embodiment, NLOS beam detection may be detected in the following ways: 1) after any interruption to beam operation, such as if there is a bandwidth part ("BWP") switch or signal quality degradation, quality degradation of a positioning quality criteria, if more than "X" NLOS beams are detected, or if less than "Y" LOS beams detected (e.g., where "X" and/or "Y" are fixed in a specifications, RRC configured, or a UE capability parameter); 2) if there is any change in a number of configured, activated, and/or released configured grant configurations; and 3) over a periodic interval "T" a beam may be considered NLOS (e.g., a snapshot of time), which may be divided into: a) short term NLOS (e.g., short-term changes in a radio environment may cause NLOS beams, resulting from people and/or objects moving); b) medium term NLOS (e.g., medium-term changes in the radio environment may cause NLOS beams, objects obstructing LOS for a temporary period (e.g., timescale in hours)); c) long term NLOS (e.g., long-term changes in the radio environment may cause NLOS beams, objects obstructing LOS for a long period (e.g., with a timescale in days, weeks, etc.)); and d) may be realized through an activation of a physical layer NLOS beam detection timer which may be configured via RRC.

Figure 4:
FIG. 4 is a table illustrating one embodiment of a UE-based candidate-beam list and/or index using a timing-based criterion.

In various embodiments, in the context of positioning, priority may be primarily given to candidate beams already containing PRS resources. If PRS resources are yet to be configured by an LMF and gNB for beam candidates, RS to be measured for candidate-beams may include but are not limited to synchronous signal block ("SSB") and/or physical broadcast channel ("PBCH"), and channel state information reference signals ("CSI-RSs"). Certain radio measurement metrics, such as received signal strength indicator ("RSSI"), may also be considered for creating a beam-candidate list. In certain embodiments, a RS RSRP may also be measured to be within an RSRP interval, or above or below a configured RSRP threshold to autonomously switch to a most suitable beam from a beam-candidate list. FIG. 4 illustrates one embodiment of a representation of a UE configured or preconfigured candidate-beam list and/or index, where $t_{Beam\_Failure} - t_3 < t_{Beam\_Failure} - t_2 < t_{Beam\_Failure} - t_1 < t_{Beam\_Failure} - t_0$. According to FIG. 4, a UE may autonomously switch to candidate beam ID 3 with a strongest respective RS RSRP and a lowest $\Delta t_{Switch\_Beam}$. Specifically, FIG. 4 is a table 400 illustrating one embodiment of a UE-based candidate-beam list and/or index using a timing-based criterion.

In certain embodiments, a beam identifier ("ID") with a strongest respective RS RSRP and a lowest $\Delta t_{Switch\_Beam}$ may be selected with positioning-related RS (e.g., DL PRS) resources satisfying one or more of the following criteria: 1) having a bandwidth ("BW") larger than 'X' or a BW not smaller than an outdated and/or exhausted beam; 2) being associated with the same BWP and/or positioning frequency layer as the outdated and/or exhausted beam or a similar BWP and/or positioning frequency layer (e.g., a BWP selected from a pair of RRC configured BWPs); and 3) not being associated with a TRP that can serve high priority data transmissions.

In some embodiments, a UE may not be expected to perform multiple (or more than "N") fast beam switching within a period of time, wherein "N" may be: 1) fixed in a specification; 2) subcarrier spacing ("SCS") dependent, frequency range dependent, and/or positioning frequency layer dependent; 3) a UE capability; or 4) RRC configured.

In various embodiments, a UE may be configured with a timer that is set if a first fast switching is performed, and a timer value may be decreased per unit of time (e.g., per slot, per DL PRS period).

In certain embodiments, "N" may be different for switching TRPs as compared to switching beams within the same TRP. In some embodiments, there may be a timer for fast beam switching within the same TRP and another timer for fast beam switching across different TRPs.

In various embodiments, a candidate-beam list is periodically updated (e.g., while in an RRC_Connected state, an RRC_IDLE state, an RRC_Inactive state, or during a measurement gap) based on a UE configuration and a serving base station may provide assistance information to the UE regarding all possible beam-candidates for a given TRP in the vicinity of the UE from the serving gNB and neighboring gNBs.

In some embodiments, there may be an application and/or switching time for switching beams or TRPs (e.g., a new set of beams, TRPs, and/or DL PRS sets may be valid after some time after an interruption, failure detection, and/or accuracy update). In such embodiments, the application and/or switching time may depend on one of the following: 1) being specified as a UE capability parameter; 2) being a fixed value in a specifications; 3) being dependent on SCS; or 4) being dependent on a number of TRPs and/or beams.

In various embodiments, a UE may forward a beam-candidate list to an LMF for positioning-related configurations in a ranked priority order based on a timing criteria, $_{\Delta tSwitch\_Beam}$, or as assistance information to aid in a calculation of a UE's location estimate.

Certain embodiments described herein may enable a UE to rapidly and autonomously switch and reselect between beams for positioning related measurements in the event of beam failure, NLOS beam detection, or lack of required LOS beams. Such embodiments may lower the probability of degrading a 2D and/or 3D positioning accuracy associated with a set of positioning-related measurements.

In some embodiments, a rapid selection and switching mechanism may enable using a priority-based criterion.

Figure 5:
FIG. 5 is a table illustrating one embodiment of a UE-based measured candidate-beam list and/or index using network configured priority-based criterion.

In various embodiments, a UE may be allowed to rapidly select a next available beam from a configured or preconfigured beam-candidate list using network configured priority indications. In such embodiments, a rapid reselection and switching mechanism may be based on a network configured priority criterion as shown in FIG. 5. Specifically, FIG. 5 is a table 500 illustrating one embodiment of a UE-based measured candidate-beam list and/or index using network configured priority-based criterion.

In some embodiments, in the event of beam failure, NLOS detection, and/or lack of suitable LOS beams, a candidate beam with a highest priority and the corresponding PRS RSRP (or PRS RSRP above a threshold) may be selected, where according to FIG. 5, a highest priority is indicated by 1 while a lowest priority is indicated by 4. Therefore, according to FIG. 5, candidate Beam ID 1 may be selected corresponding to the highest priority and best measured PRS RSRP.

In various embodiments, in the event that network configured lower priority beams have a stronger RS RSRP (e.g., beam candidate 3 is measured to be −80 dBm in FIG. 5), a UE may choose priority indication over beam strength.

Figure 6:
FIG. 6 is a table illustrating one embodiment of a UE-based measured candidate-beam list and/or index using UE-based configured priority-based criterion.

In some embodiments, a UE may perform prioritization using a configured UE-based rule that compares a measured RS RSRP against a configured RS RSRP ($\alpha$) interval and then dynamically assigns a priority for reselection and switching as shown in FIG. 6. In such embodiments, candidate beam 3 may be selected based on a UE-assigned priority. In various embodiments, there may be a configured (P)RS RSRP interval ($\alpha$)-to-priority mapping. The configured (P)RS RSRP interval ($\alpha$) to priority mapping may be configured or preconfigured to a UE using LPP and/or RRC signaling. FIG. 6 is a table 600 illustrating one embodiment of a UE-based measured candidate-beam list and/or index using UE-based configured priority-based criterion.

In certain embodiments, a network configured priority may be configured by a gNB (e.g., via downlink control information ("DCI"), RRC) or LMF (e.g., via LPP) and may be based on a variety of factors such as available PRS resource bandwidth which may directly impact a location estimation accuracy or a type of location request based on positioning application service requirements.

In some embodiments, a network may assign a priority based on a latency requirement of a particular service and/or use and/or in combination with a required horizontal accuracy, vertical accuracy, heading, and/or velocity of a UE. The priority may be signaled using layer-2 assistance data signaling (e.g., based on positioning system information) associated with a positioning-related measurement (e.g., LPP, RRC) or layer-1 priority indications (e.g., using DCI). The network may assign priority indications and/or a (P)RS RSRP interval-to-priority mapping in FIG. 5 and FIG. 6 based on one or more of the following combination of positioning performance indicators: 1) a delay budget of a positioning service and/or use or latency requirements (e.g., time to first fix ("TTFF")); 2) horizontal accuracy and/or vertical accuracy requirements; 3) a velocity requirement of a UE; 4) a heading requirement of the UE; 5) a positioning error after an initial UE position estimate calculation; and/or 6) service level requirements.

In various embodiments, on a physical layer, priority indications may correspond to a specific set of DL or UL positioning-related signals (e.g., PRS and/or sounding reference signal ("SRS") resource ID, PRS and/or SRS resource set, TRP-ID and/or DL-PRS-ID associated with a PRS and/or SRS resource and/or resource set.

In certain embodiments, a priority indication enables a UE to perform low latency positioning through dynamic reselection and/or switching of beams to perform positioning-related measurements and avoid traditional beam reselection procedures in the event of beam failure, NLOS classification, or lack of any LOS beams. In such embodiments, the UE may avoid notifying a location server of such events and may therefore decrease signaling overhead and delay of such notifications.

In some embodiments, a rapid selection and switching mechanism may be enabled using a LOS and/or NLOS criterion.

Figure 7:
FIG. 7 is a table illustrating one embodiment of a UE-based measured candidate-beam list and/or index using an LOS and/or NLOS identification.

In various embodiments, a method for allowing a UE to rapidly reselect or switch to a next available beam from a configured or preconfigured beam-candidate list may be used. A rapid selection and switching mechanism may be based on an apriori and/or earlier LOS and/or NLOS identification of beam candidates as shown in FIG. 7. Specifically, FIG. 7 is a table 700 illustrating one embodiment of a UE-based measured candidate-beam list and/or index using an LOS and/or NLOS identification.

In certain embodiments, since NLOS degrades positioning performance, available LOS beam pairs may be exploited to recover positioning performance or increase accuracy of a UE estimate based on corresponding positioning measurements. In such embodiments, candidate beams may be classified based on state-of-the-art NLOS identification techniques such as hypothesis testing, machine learning techniques using feature extraction, root means squared ("RMS") delay spread, amplitude, range estimates, and so forth. Some embodiments of LOS and/or NLOS classification may be based upon a threshold function ($\beta$) which may include a combination of features such as signal standard deviation and mean, signal kurtosis, skewness, Rician K-factor, and/or goodness of fit. In various embodiments, a beam may be classified as LOS and/or NLOS by exceeding and/or not exceeding a configured threshold $\beta$.

In certain embodiments, upon detection of an NLOS beam, a UE may autonomously switch to a more suitable LOS beam based on a measured candidate-beam list and/or index in FIG. 7 (e.g., candidate beam ID 1 may meet the aforementioned criteria for switching due to a stronger (P)RS RSRP than candidate beam ID 3 which has been classified as LOS.

In various embodiments, an LOS and/or NLOS indication enables a UE to discard or not consider beams containing positioning-related measurements which have been deemed to be NLOS. Avoiding NLOS beams may increase an overall positioning accuracy performance.

In certain embodiments, a rapid selection and switching mechanism may enable using a UE positioning error.

In some embodiments, a UE may rapidly select a beam from a configured beam-candidate list of a single TRP depending on a positioning error (e.g., integrity of a position estimate based on a confidence level) calculated at the UE or a location server. The positioning error may be defined by a difference between the UE's true position and an estimated position. In one embodiment, if a positioning error of a UE's estimated position is below a required accuracy mentioned in a request, then the UE may rapidly select another beam containing PRS resources from a configured candidate beam list. In another embodiment, a UE does not need to perform reselection of a beam even if any RS RSRP of the beam is below a configured interval or threshold value unless a positioning error is above a certain threshold.

In various embodiments, configuration for threshold values may be provided for each positioning method.

In certain embodiments, configuration of a threshold value for each positioning method may be provided to a UE. For example, if a UE measures a PRS resource from beam 1 using TDOA and if an RSRP measured from beam 1 is below a certain configured threshold for good TDOA estimate, then the UE may dynamically calculate its position estimate using another positioning method for this PRS resource (e.g., based on a UE-based positioning mechanism) and inform a gNB and/or LPP, or the UE may indicate to the gNB and/or LMF to modify the positioning method based on real-time conditions at the UE.

In some embodiments, a gNB may dynamically update a transmission configuration indicator ("TCI") state and/or quasi-co-location ("QCL") assumption of a beam transmitting PRS resource within the PRS transmission occasion if a measured RSRP is below a certain configured threshold or an estimated positioning does not fulfill a positioning accuracy required by a location server (e.g., LMF) or a UE.

In various embodiments, a UE's positioning may be estimated from a PRS resource transmitted from one or more TRPs and/or beams if the measured PRS RSRP is below a certain configured threshold value.

In certain embodiments, one or more combinations of embodiments described herein may be combined. In some embodiments, switching between carriers or an addition of carriers within a PRS transmission occasion or reporting may be performed.

In various embodiments, a UE may signal: 1) an LMF (e.g., via LPP); or 2) a gNB (e.g., via uplink control information ("UCI"), RRC) to signal the LMF (e.g., via NR positioning protocol annex ("NRPPa")) to update its UE positioning configuration based on a dynamic beam reselection and/or switching associated with various embodiments (e.g., if a positioning-related RS measurement is below a certain threshold or identified as NLOS and not deemed suitable for a desired accuracy).

In certain embodiments, two-level switching criteria for fast TRP switching may be used within candidate beams of different TRPs or sets of TRPs.

In some embodiments, a fast and/or rapid switching for beam-candidates belonging to different TRPs may be used and may serve as an extension to other embodiments. If all the beams for a TRP are exhausted or deemed not suitable for PRS measurement, lack any PRS configuration measurements, or have LOS unavailability, a UE may perform one of the following for rapid reselection: 1) switch to another beam from a beam-candidate list of another TRP based on different criteria; 2) switch to a beam of another TRP within a set of TRP candidates which are prioritized based on a network configured TRP priority indication; and/or 3) switch to a configured default beam of another TRP within a set of TRP candidates.

Figure 8:
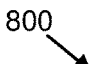
FIG. 8 is a table illustrating one embodiment rapid switching between different TRPs.

In various embodiments, different TRPs or sets of TRPs may belong to a serving gNB or neighboring gNBs in a vicinity of the UE's location. If the available TRPs are also from neighboring gNBs, then an RSRP of PRS resources may be a prioritized RS measurement (e.g., beams from neighboring cells containing positioning-related RS resources may be prioritized). A serving gNB may obtain area beam information from a network entity, such as the LMF, or along an Xn interface which connects the serving gNB with other neighboring gNBs. The area beam information includes an index of different beam-candidate lists from different gNBs and/or TRPs. FIG. 8 shows an exemplary representation of a two-level switching and/or reselection mechanism using LOS and/or NLOS identification criteria. In certain embodiments, a candidate beam ID B1 from TRP B is selected as a most appropriate beam for rapid switching In some embodiments, a default beam may be configured among a set of beam candidates B1-B4 from TRP B. The default beam may be used to perform rapid reselection and/or switching. In various embodiments, a set of TRP candidates and/or candidate beams associated with DL PRS resources may have the same DL PRS positioning frequency layer configuration (e.g., subcarrier spacing, cyclic prefix, point A—the absolute frequency of the lowest subcarrier of a reference resource block).

FIG. 8 is a table 800 illustrating one embodiment rapid switching between different TRPs. As may be appreciated, any embodiments described herein may be used in conjunction with each other to perform rapid beam switching of a beam pair.

In certain embodiments, NLOS beam detection may include no LOS measurements with a spatial relation and/or setting with a source RS (e.g., SSB or DL PRS) that is QCL Type-D with a target RS (e.g., DL PRS of a DL PRS resource) corresponding to the beam. The NLOS beam detection may be identified (e.g., metrics distinguishing LOS and NLOS) based on one or more channel characteristics (e.g., received signal power, features extracted from channel power delay profile) received signal antenna array based techniques (e.g., received signal phase difference between antenna ports, AoA and/or AoD measurements), time of arrival ("TOA") measurements, consistency between different measurements (e.g., TOA and path loss measurements, consistency between direction and/or angle of departure and direction and/or angle of arrival).

In some embodiments, beam failure detection may be based on a quality of a beam and/or radio link (e.g., based on RSRP measurement on a beam failure detection RS ("BFD-RS") as compared to a threshold or within an interval, a quality of BFD-RS as compared against a threshold level at which a downlink radio level link of a given BFD-RS resource cannot be reliably received and can correspond to X % (e.g., X=10%) block error rate of a hypothetical physical downlink control channel ("PDCCH") transmission. The BFD-RS may be a DL PRS or a source RS (e.g., SSB) that is quasi co-located (e.g., QCL Type-D) with the DL PRS. In various embodiments, an X % block error rate ("BLER") of a hypothetical PDCCH may be used to evaluate a quality of a beam link only for beams belonging to a serving cell (or gNB) and not for neighbor cells (or gNBs).

In various embodiments, a number of instance indication of beam failure and/or NLOS beam detection may be counted while a timer is running (e.g., with the timer started or restarted at each beam failure and/or NLOS beam detection instance indication—the value of the timer may be configured by a network) and, if the instance counter reaches a threshold (e.g., maximum value configured by the network), the UE may switch and reselect between beams for positioning related measurements. The instance indication of whether a beam failure and/or NLOS beam is detected may be determined with a certain periodicity (e.g., based on the periodicity of the PRS or BFD-RS, or configured by the network).

Figure 9:
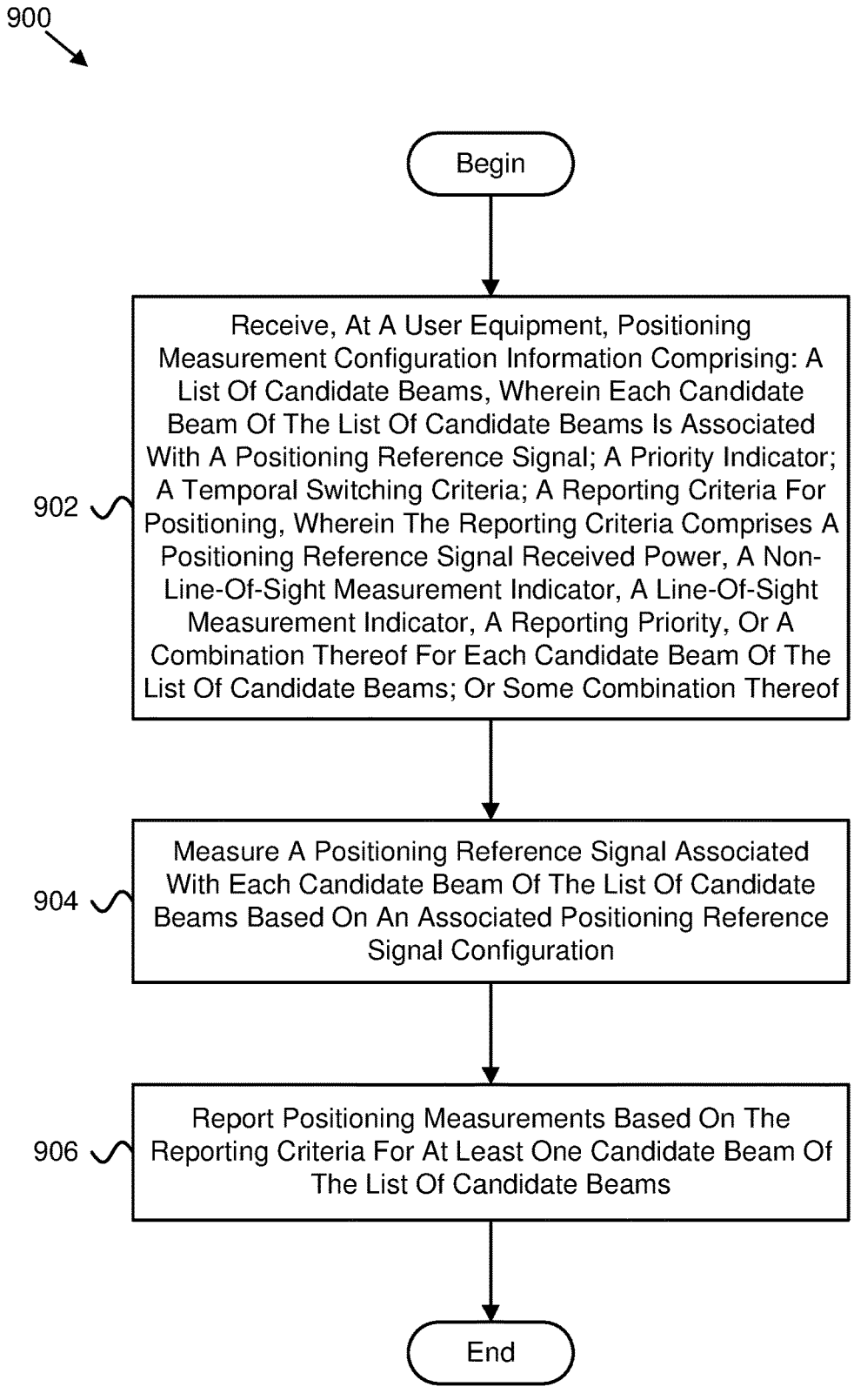
FIG. 9 is a flow chart diagram illustrating one embodiment of a method for reporting positioning measurements.

FIG. 9 is a flow chart diagram illustrating one embodiment of a method 900 for reporting positioning measurements. In some embodiments, the method 900 is performed by an apparatus, such as the remote unit 102. In certain embodiments, the method 900 may be performed by a processor executing program code, for example, a microcontroller, a microprocessor, a CPU, a GPU, an auxiliary processing unit, a FPGA, or the like.

In various embodiments, the method 900 includes receiving 902, at a user equipment, positioning measurement configuration information including: a list of candidate beams, wherein each candidate beam of the list of candidate beams is associated with a positioning reference signal; a priority indicator; a temporal switching criteria; and/or a reporting criteria for positioning. The reporting criteria includes a positioning reference signal received power, a non-line-of-sight measurement indicator, a line-of-sight measurement indicator, and/or a reporting priority for each candidate beam of the list of candidate beams. In some embodiments, the method 900 includes measuring 904 a positioning reference signal associated with each candidate beam of the list of candidate beams based on an associated positioning reference signal configuration. In certain embodiments, the method 900 includes reporting 906 positioning measurements based on the reporting criteria for at least one candidate beam of the list of candidate beams.

In certain embodiments, receiving the positioning measurement configuration information comprises receiving the positioning measurement configuration information from a location server via a long term evolution positioning protocol. In some embodiments, receiving the positioning measurement configuration information comprises retrieving the positioning measurement configuration information from a stored preconfigured information set. In various embodiments, the reporting priority is associated with a downlink positioning-related signal, an uplink positioning-related signal, a downlink positioning-related signal identifier, an uplink positioning-related signal identifier, a positioning reference signal identifier, a sounding reference signal identifier, a positioning reference signal resource set, a sounding reference signal resource set, a transmission and reception point identifier, or some combination thereof.

In one embodiment, the method 900 further comprises selecting a beam for reporting from the list of candidate beams based on the temporal switching criteria. In certain embodiments, the beam for reporting comprises a beam from a transmission and reception point within a set of transmission and reception points distinct from a currently received beam, and each transmission and reception point of the set of transmission and reception points maps to a priority indication. In some embodiments, the reporting priority comprises a network configured priority transmitted as assistance data by a location server using a long term evolution positioning protocol.

In various embodiments, the positioning measurement configuration information is associated with a prior initiation of a location request or a long term evolution positioning protocol session. In one embodiment, the method 900 further comprises transmitting the list of candidate beams to the location server as assistance information, wherein the list of candidate beams comprises at least one candidate beam related positioning reference signal measurement, the at least one candidate beam related positioning reference signal measurement comprises a positioning reference signal received power, a non-line-of-sight measurement indicator, a line-of-sight measurement indicator, or a combination thereof.

Figure 10:
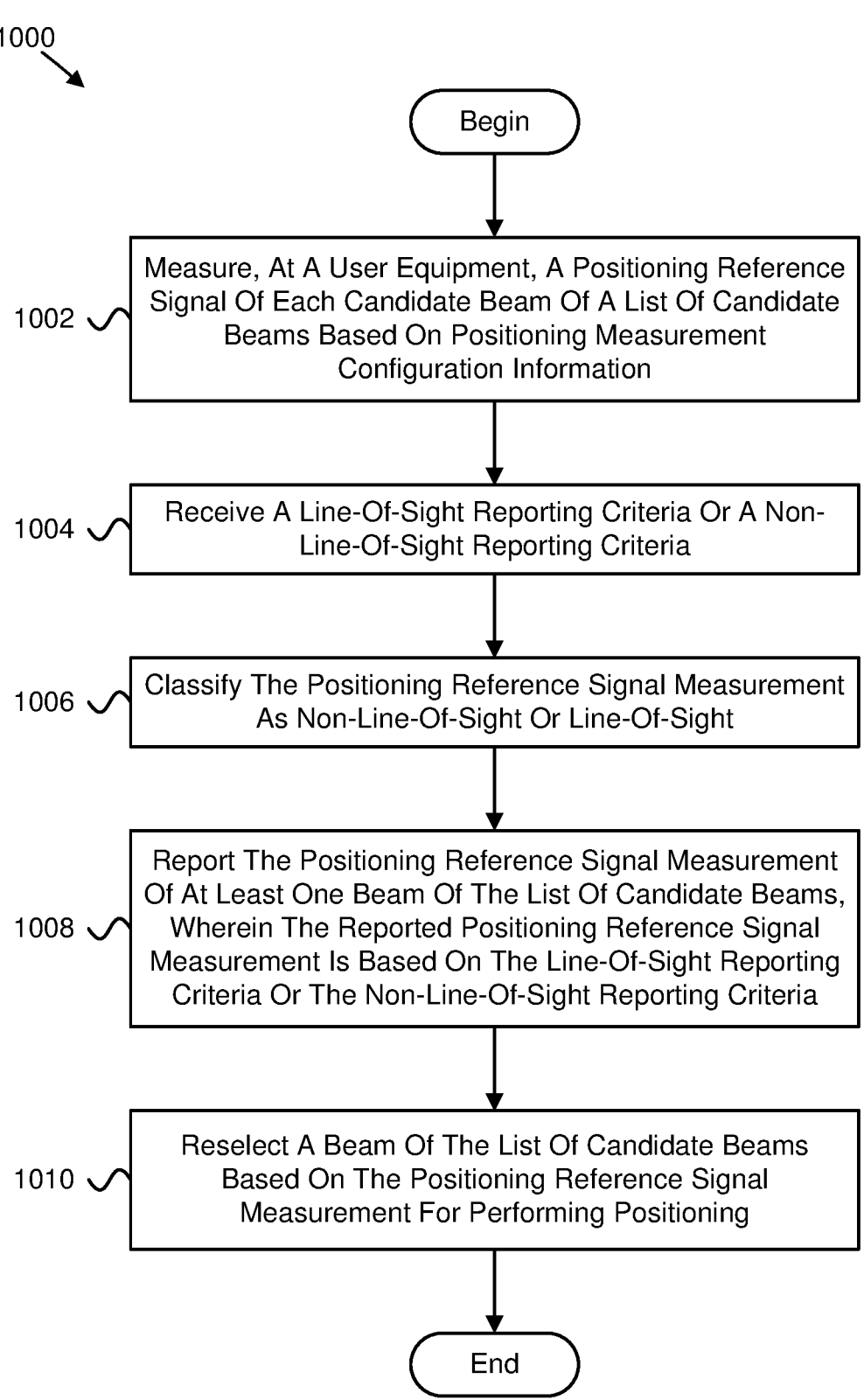
FIG. 10 is a flow chart diagram illustrating another embodiment of a method for reporting positioning measurements.

FIG. 10 is a flow chart diagram illustrating one embodiment of a method 1000 for reporting positioning measurements. In some embodiments, the method 1000 is performed by an apparatus, such as the remote unit 102. In certain embodiments, the method 1000 may be performed by a processor executing program code, for example, a microcontroller, a microprocessor, a CPU, a GPU, an auxiliary processing unit, a FPGA, or the like.

In various embodiments, the method 1000 includes measuring 1002, at a user equipment, a positioning reference signal of each candidate beam of a list of candidate beams based on positioning measurement configuration information. In certain embodiments, the method 1000 includes receiving 1004 a line-of-sight reporting criteria or a non-line-of-sight reporting criteria. In various embodiments, the method 1000 includes classifying 1006 the positioning reference signal measurement as non-line-of-sight or line-of-sight. In some embodiments, the method 1000 includes reporting 1008 the positioning reference signal measurement of at least one beam of the list of candidate beams. The reported positioning reference signal measurement is based on the line-of-sight reporting criteria or the non-line-of-sight reporting criteria. In certain embodiments, the method 1000 includes reselecting 1010 a beam of the list of candidate beams based on the positioning reference signal measurement for performing positioning In certain embodiments, classifying the positioning reference signal measurement as line-of-sight or non-line-of-sight is based on a received metric distinguishing line-of-sight or non-line-of-sight beam positioning reference signal measurement. In some embodiments, the positioning reference signal measurement comprises a received signal power, features extracted from a channel power delay profile, a received signal phase difference between antenna ports, a time-of-arrival, a pathloss measurement, or a combination thereof. In various embodiments, the method 1000 further comprises reporting at least one non-line-of-sight beam or at least one line-of-sight beam associated with the positioning reference signal measurement.

In one embodiment, classifying the positioning reference signal measurement comprises determining a non-line-of sight beam or a line-of-sight beam based on a predetermined time interval. In certain embodiments, the predetermined time interval comprises a short-term change in a radio environment, a medium-term change in the radio environment, or a long-term change in the radio environment. In some embodiments, the predetermined time interval is activated via a physical layer, configured via radio resource control signaling, a long term evolution positioning protocol, or a combination thereof.

In various embodiments, classifying the positioning reference signal measurement comprises determining a non-line-of sight beam or a line-of-sight beam based on a predetermined function, a predetermined threshold, or a combination thereof. In one embodiment, the predetermined function comprises a signal standard deviation, a signal mean, a signal kurtosis, a skewness, a Rician K-factor, a goodness of fit, or some combination thereof. In certain embodiments, the predetermined threshold comprises a hypothesis test, a root mean square delay spread, an amplitude, a range estimate, or some combination thereof. In some embodiments, is reporting the positioning reference signal measurement of the at least one beam comprises reporting a set of line-of-sight only measurement indicators, a set of non-line-of-sight only measurement indicators, or a combination thereof.

In one embodiment, a method comprises: receiving, at a user equipment, positioning measurement configuration information comprising: a list of candidate beams, wherein each candidate beam of the list of candidate beams is associated with a positioning reference signal; a priority indicator; a temporal switching criteria; a reporting criteria for positioning, wherein the reporting criteria comprises a positioning reference signal received power, a non-line-of-sight measurement indicator, a line-of-sight measurement indicator, a reporting priority, or a combination thereof for each candidate beam of the list of candidate beams; or some combination thereof; measuring a positioning reference signal associated with each candidate beam of the list of candidate beams based on an associated positioning reference signal configuration; and reporting positioning measurements based on the reporting criteria for at least one candidate beam of the list of candidate beams.

In certain embodiments, receiving the positioning measurement configuration information comprises receiving the positioning measurement configuration information from a location server via a long term evolution positioning protocol.

In some embodiments, receiving the positioning measurement configuration information comprises retrieving the positioning measurement configuration information from a stored preconfigured information set.

In various embodiments, the reporting priority is associated with a downlink positioning-related signal, an uplink positioning-related signal, a downlink positioning-related signal identifier, an uplink positioning-related signal identifier, a positioning reference signal identifier, a sounding reference signal identifier, a positioning reference signal resource set, a sounding reference signal resource set, a transmission and reception point identifier, or some combination thereof.

In one embodiment, the method further comprises selecting a beam for reporting from the list of candidate beams based on the temporal switching criteria.

In certain embodiments, the beam for reporting comprises a beam from a transmission and reception point within a set of transmission and reception points distinct from a currently received beam, and each transmission and reception point of the set of transmission and reception points maps to a priority indication.

In some embodiments, the reporting priority comprises a network configured priority transmitted as assistance data by a location server using a long term evolution positioning protocol.

In various embodiments, the positioning measurement configuration information is associated with a prior initiation of a location request or a long term evolution positioning protocol session.

In one embodiment, the method further comprises transmitting the list of candidate beams to the location server as assistance information, wherein the list of candidate beams comprises at least one candidate beam related positioning reference signal measurement, the at least one candidate beam related positioning reference signal measurement comprises a positioning reference signal received power, a non-line-of-sight measurement indicator, a line-of-sight measurement indicator, or a combination thereof.

In one embodiment, an apparatus comprising a user equipment. The apparatus further comprises: a receiver that receives positioning measurement configuration information comprising: a list of candidate beams, wherein each candidate beam of the list of candidate beams is associated with a positioning reference signal; a priority indicator; a temporal switching criteria; a reporting criteria for positioning, wherein the reporting criteria comprises a positioning reference signal received power, a non-line-of-sight measurement indicator, a line-of-sight measurement indicator, a reporting priority, or a combination thereof for each candidate beam of the list of candidate beams; or some combination thereof; and a processor that: measures a positioning reference signal associated with each candidate beam of the list of candidate beams based on an associated positioning reference signal configuration; and reports positioning measurements based on the reporting criteria for at least one candidate beam of the list of candidate beams.

In certain embodiments, the receiver receiving the positioning measurement configuration information comprises the receiver receiving the positioning measurement configuration information from a location server via a long term evolution positioning protocol.

In some embodiments, the receiver receiving the positioning measurement configuration information comprises the processor retrieving the positioning measurement configuration information from a stored preconfigured information set.

In various embodiments, the reporting priority is associated with a downlink positioning-related signal, an uplink positioning-related signal, a downlink positioning-related signal identifier, an uplink positioning-related signal identifier, a positioning reference signal identifier, a sounding reference signal identifier, a positioning reference signal resource set, a sounding reference signal resource set, a transmission and reception point identifier, or some combination thereof.

In one embodiment, the processor selects a beam for reporting from the list of candidate beams based on the temporal switching criteria.

In certain embodiments, the beam for reporting comprises a beam from a transmission and reception point within a set of transmission and reception points distinct from a currently received beam, and each transmission and reception point of the set of transmission and reception points maps to a priority indication.

In some embodiments, the reporting priority comprises a network configured priority transmitted as assistance data by a location server using a long term evolution positioning protocol.

In various embodiments, the positioning measurement configuration information is associated with a prior initiation of a location request or a long term evolution positioning protocol session.

In one embodiment, the apparatus further comprises a transmitter that transmits the list of candidate beams to the location server as assistance information, wherein the list of candidate beams comprises at least one candidate beam related positioning reference signal measurement, the at least one candidate beam related positioning reference signal measurement comprises a positioning reference signal received power, a non-line-of-sight measurement indicator, a line-of-sight measurement indicator, or a combination thereof.

In one embodiment, a method comprises: measuring, at a user equipment, a positioning reference signal of each candidate beam of a list of candidate beams based on positioning measurement configuration information; receiving a line-of-sight reporting criteria or a non-line-of-sight reporting criteria; classifying the positioning reference signal measurement as non-line-of-sight or line-of-sight; reporting the positioning reference signal measurement of at least one beam of the list of candidate beams, wherein the reported positioning reference signal measurement is based on the line-of-sight reporting criteria or the non-line-of-sight reporting criteria; and reselecting a beam of the list of candidate beams based on the positioning reference signal measurement for performing positioning.

In certain embodiments, classifying the positioning reference signal measurement as line-of-sight or non-line-of-sight is based on a received metric distinguishing line-of-sight or non-line-of-sight beam positioning reference signal measurement.

In some embodiments, the positioning reference signal measurement comprises a received signal power, features extracted from a channel power delay profile, a received signal phase difference between antenna ports, a time-of-arrival, a pathloss measurement, or a combination thereof.

In various embodiments, the method further comprises reporting at least one non-line-of-sight beam or at least one line-of-sight beam associated with the positioning reference signal measurement.

In one embodiment, classifying the positioning reference signal measurement comprises determining a non-line-of sight beam or a line-of-sight beam based on a predetermined time interval.

In certain embodiments, the predetermined time interval comprises a short-term change in a radio environment, a medium-term change in the radio environment, or a long-term change in the radio environment.

In some embodiments, the predetermined time interval is activated via a physical layer, configured via radio resource control signaling, a long term evolution positioning protocol, or a combination thereof.

In various embodiments, classifying the positioning reference signal measurement comprises determining a non-line-of sight beam or a line-of-sight beam based on a predetermined function, a predetermined threshold, or a combination thereof.

In one embodiment, the predetermined function comprises a signal standard deviation, a signal mean, a signal kurtosis, a skewness, a Rician K-factor, a goodness of fit, or some combination thereof.

In certain embodiments, the predetermined threshold comprises a hypothesis test, a root mean square delay spread, an amplitude, a range estimate, or some combination thereof.

In some embodiments, reporting the positioning reference signal measurement of the at least one beam comprises reporting a set of line-of-sight only measurement indicators, a set of non-line-of-sight only measurement indicators, or a combination thereof.

In one embodiment, an apparatus comprising a user equipment. The apparatus further comprises: a processor that measures a positioning reference signal of each candidate beam of a list of candidate beams based on positioning measurement configuration information; and a receiver that receives a line-of-sight reporting criteria or a non-line-of-sight reporting criteria; wherein the processor: classifies the positioning reference signal measurement as non-line-of-sight or line-of-sight; reports the positioning reference signal measurement of at least one beam of the list of candidate beams, wherein the reported positioning reference signal measurement is based on the line-of-sight reporting criteria or the non-line-of-sight reporting criteria; and reselects a beam of the list of candidate beams based on the positioning reference signal measurement for performing positioning.

In certain embodiments, the processor classifies the positioning reference signal is measurement as line-of-sight or non-line-of-sight based on a received metric distinguishing line-of-sight or non-line-of-sight beam positioning reference signal measurement.

In some embodiments, the positioning reference signal measurement comprises a received signal power, features extracted from a channel power delay profile, a received signal phase difference between antenna ports, a time-of-arrival, a pathloss measurement, or a combination thereof.

In various embodiments, the processor reports at least one non-line-of-sight beam or at least one line-of-sight beam associated with the positioning reference signal measurement.

In one embodiment, the processor classifying the positioning reference signal measurement comprises the processor determining a non-line-of sight beam or a line-of-sight beam based on a predetermined time interval.

In certain embodiments, the predetermined time interval comprises a short-term change in a radio environment, a medium-term change in the radio environment, or a long-term change in the radio environment.

In some embodiments, the predetermined time interval is activated via a physical layer, configured via radio resource control signaling, a long term evolution positioning protocol, or a combination thereof.

In various embodiments, the processor classifying the positioning reference signal measurement comprises the processor determining a non-line-of sight beam or a line-of-sight beam based on a predetermined function, a predetermined threshold, or a combination thereof.

In one embodiment, the predetermined function comprises a signal standard deviation, a signal mean, a signal kurtosis, a skewness, a Rician K-factor, a goodness of fit, or some combination thereof.

In certain embodiments, the predetermined threshold comprises a hypothesis test, a root mean square delay spread, an amplitude, a range estimate, or some combination thereof.

In some embodiments, the processor reporting the positioning reference signal measurement of the at least one beam comprises the processor reporting a set of line-of-sight only measurement indicators, a set of non-line-of-sight only measurement indicators, or a combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
    receiving positioning measurement configuration information, wherein receiving the positioning measurement configuration information comprises:
        receiving a list of candidate beams, wherein each candidate beam of the list of candidate beams is associated with a positioning reference signal (PRS);
        receiving a priority indicator; and
        receiving a reporting criteria for positioning comprising a non-line-of-sight (non-LOS) measurement indicator, a line-of-sight (LOS) measurement indicator, and a reporting priority for each candidate beam of the list of candidate beams;
    measuring a PRS associated with each candidate beam of the list of candidate beams based on an associated PRS configuration; and
    reporting positioning measurements based on the reporting criteria for at least one candidate beam of the list of candidate beams.

2. The method of claim 1, further comprising receiving the positioning measurement configuration information from a location server via a long term evolution (LTE) positioning protocol.

3. The method of claim 1, further comprising retrieving the positioning measurement configuration information from a stored preconfigured information set.

4. The method of claim 1, wherein the reporting priority is associated with one or more of a downlink positioning-related signal, an uplink positioning-related signal, a downlink positioning-related signal identifier, an uplink positioning-related signal identifier, a PRS identifier, a sounding reference signal (SRS) identifier, a PRS resource set, a SRS resource set, or a transmission and reception point (TRP) identifier (ID).

5. The method of claim 1, further comprising selecting a beam for reporting from the list of candidate beams based on a temporal switching criteria.

6. The method of claim 5, wherein the beam for reporting comprises a beam from a transmission and reception (TRP)

point within a set of TRPs distinct from a currently received beam, and each TRP of the set of TRPs maps to a priority indication.

7. The method of claim 1, wherein the reporting priority comprises a network configured priority transmitted as assistance data by a location server using a long term evolution (LTE) positioning protocol.

8. The method of claim 1, wherein the positioning measurement configuration information is associated with a prior initiation of a location request or a long term evolution (LTE) positioning protocol session.

9. The method of claim 1, further comprising transmitting the list of candidate beams to a location server as assistance information, wherein the list of candidate beams comprises at least one candidate beam related PRS measurement, the at least one candidate beam related PRS measurement comprises one or more of a PRS received power, a non-LOS measurement indicator, or a LOS measurement indicator.

10. A method performed by a user equipment (UE), the method comprising:
    receiving positioning measurement configuration information, wherein receiving the positioning measurement configuration information comprises:
        receiving a list of candidate beams, wherein each candidate beam of the list of candidate beams is associated with a positioning reference signal (PRS);
        receiving a priority indicator; and
        receiving a reporting criteria for positioning comprising a non-line-of-sight (non-LOS) measurement indicator, a line-of-sight (LOS) measurement indicator, and a reporting priority for each candidate beam of the list of candidate beams;
    measuring a PRS of each candidate beam of a list of candidate beams based on the positioning measurement configuration information;
    receiving a line-of-sight (LOS) reporting criteria or a non-line-of-sight (non-LOS) reporting criteria;
    classifying the PRS measurement as non-LOS or LOS;
    reporting the PRS measurement of at least one beam of the list of candidate beams, wherein the reported PRS measurement is based on the LOS reporting criteria or the non-LOS reporting criteria; and
    reselecting a beam of the list of candidate beams based on the PRS measurement for performing positioning.

11. The method of claim 10, further comprising classifying the PRS measurement as LOS or non-LOS based on a received metric distinguishing LOS or non-LOS beam PRS measurement.

12. The method of claim 11, wherein the PRS measurement comprises one or more of a received signal power, features extracted from a channel power delay profile, a received signal phase difference between antenna ports, a time-of-arrival, or a pathloss measurement.

13. The method of claim 10, further comprising reporting at least one non-LOS beam or at least one LOS beam associated with the PRS measurement.

14. The method of claim 10, wherein classifying the PRS measurement comprises determining a non-LOS beam or a LOS beam based on a predetermined time interval.

15. The method of claim 14, wherein the predetermined time interval comprises a short-term change in a radio environment, a medium-term change in the radio environment, or a long-term change in the radio environment.

16. The method of claim 14, wherein the predetermined time interval is one or more of activated via a physical layer, configured via radio resource control (RRC) signaling, or a long term evolution (LTE) positioning protocol.

17. The method of claim 10, wherein classifying the PRS measurement comprises determining a non-LOS beam or a LOS beam based on one or more of a predetermined function or a predetermined threshold.

18. The method of claim 17, wherein the predetermined function comprises one or more of a signal standard deviation, a signal mean, a signal kurtosis, a skewness, a Rician K-factor, or a goodness of fit.

19. The method of claim 17, wherein the predetermined threshold comprises one or more of a hypothesis test, a root mean square delay spread, an amplitude, or a range estimate.

20. The method of claim 10, wherein reporting the PRS measurement of the at least one beam comprises one or more of reporting a set of LOS only measurement indicators or a set of non-LOS only measurement indicators.

\* \* \* \* \*